United States Patent
Ito et al.

(10) Patent No.: US 9,210,459 B2
(45) Date of Patent: Dec. 8, 2015

(54) OPERATION TERMINAL, ELECTRONIC UNIT, AND ELECTRONIC UNIT SYSTEM

(75) Inventors: Shin Ito, Tokyo (JP); Eiju Yamada, Kanagawa (JP); Yoshinori Ohashi, Tokyo (JP)

(73) Assignee: Sony Corporation (JP)

(*) Notice: Subject to any disclaimer, the term of this patent is extended or adjusted under 35 U.S.C. 154(b) by 237 days.

(21) Appl. No.: 13/116,338

(22) Filed: May 26, 2011

(65) Prior Publication Data

US 2011/0298700 A1 Dec. 8, 2011

(30) Foreign Application Priority Data

Jun. 4, 2010 (JP) ................................ P2010-128741

(51) Int. Cl.
| | |
|---|---|
| G06F 3/033 | (2013.01) |
| H04N 21/422 | (2011.01) |
| G06F 3/0346 | (2013.01) |
| H04M 1/725 | (2006.01) |
| H04N 5/44 | (2011.01) |

(52) U.S. Cl.
CPC ........ *H04N 21/42224* (2013.01); *G06F 3/0346* (2013.01); *H04M 1/72533* (2013.01); *H04N 21/42222* (2013.01); *G06F 2203/0384* (2013.01); *H04M 2250/12* (2013.01); *H04N 2005/4432* (2013.01)

(58) Field of Classification Search
CPC ..... G06F 3/0488; G06F 3/041; G06F 3/0482; G06F 3/04847; G06F 3/017; G06F 3/0346; G06F 2203/0384; H04N 21/42224; H04N 21/42222; H04N 2005/4432; H04M 1/72533
See application file for complete search history.

(56) References Cited

U.S. PATENT DOCUMENTS

| | | | | |
|---|---|---|---|---|
| 2005/0212760 A1* | 9/2005 | Marvit et al. | ................. | 345/156 |
| 2008/0259094 A1* | 10/2008 | Kim et al. | ...................... | 345/651 |
| 2009/0153289 A1* | 6/2009 | Hope et al. | ..................... | 340/5.1 |
| 2009/0179869 A1* | 7/2009 | Slotznick | ...................... | 345/173 |
| 2009/0278796 A1* | 11/2009 | Komazaki | ..................... | 345/156 |
| 2009/0303184 A1* | 12/2009 | Tao et al. | ...................... | 345/163 |
| 2010/0060569 A1* | 3/2010 | Shamilian | ..................... | 345/156 |
| 2010/0245238 A1* | 9/2010 | Kumagai et al. | ............. | 345/156 |
| 2011/0090407 A1* | 4/2011 | Friedman | ...................... | 348/734 |

(Continued)

FOREIGN PATENT DOCUMENTS

| | | |
|---|---|---|
| JP | 2002-073247 A | 3/2002 |
| JP | 2006229549 A | 8/2006 |

(Continued)

OTHER PUBLICATIONS

Office Action from Japanese Application No. 2010-128741, dated Dec. 4, 2013.

(Continued)

*Primary Examiner* — Lixi C Simpson
(74) *Attorney, Agent, or Firm* — Lerner, David, Littenberg, Krumholz & Mentlik, LLP

(57) ABSTRACT

An operation terminal includes: a posture detection section detecting a posture of the operation terminal, a change of the posture, or both thereof; a mode selection section selecting, based on a detection result of the posture detection section, an operation mode from a plurality of operation modes including a gesture mode and a non-gesture mode; and a transmission section sending a control command corresponding to the detection result of the posture detection section to an electronic unit when the gesture mode is currently selected.

11 Claims, 14 Drawing Sheets

(56) References Cited

U.S. PATENT DOCUMENTS

| | | | |
|---|---|---|---|
| 2011/0205156 A1* | 8/2011 | Gomez et al. | 345/157 |
| 2012/0144299 A1* | 6/2012 | Patel et al. | 715/702 |

FOREIGN PATENT DOCUMENTS

| | | |
|---|---|---|
| JP | 2006309293 A | 11/2006 |
| JP | 2010257037 A | 11/2010 |
| JP | 2012508530 A | 4/2012 |
| WO | 2010034795 A1 | 4/2010 |

OTHER PUBLICATIONS

Office Action from Japanese Application No. 2010-128741, dated Apr. 1, 2014.

* cited by examiner

| GESTURE MOTION | CONTROL COMMAND | OPERATION |
|---|---|---|
| ⇐ | LEFT | CHANNEL − |
| ⇒ | RIGHT | CHANNEL + |
| ⇑ | UP | VOL + |
| ⇓ | DOWN | VOL − |
| ↻ | ROTATION | — |

FIG. 15

OPERATION TERMINAL, ELECTRONIC UNIT, AND ELECTRONIC UNIT SYSTEM

CROSS-REFERENCE TO RELATED APPLICATION

The present application claims priority from Japanese Patent Application No. JP 2010-128741 filed in the Japanese Patent Office on Jun. 4, 2010, the entire content of which is incorporated herein by reference.

The present disclosure contains subject matter related to that disclosed in Japanese Priority Patent Application JP 2010-128741 filed in the Japan Patent Office on Jun. 4, 2010, the entire contents of which are hereby incorporated by reference.

BACKGROUND OF THE INVENTION

The present disclosure relates to an operation terminal, an electronic unit operated by the operation terminal, and an electronic unit system including the operation terminal and the electronic unit.

In recent years, attention has been paid to electronic units which incorporate a sensor such as a gravity sensor and an acceleration sensor, and can carry out an operation on the basis of information obtained from the sensor. The electronic units equipped with the sensor can be intuitively operated by varying its posture, for example. Therefore, with the increasing high functionality, multi functionality, and complicated user operation of recent electronic units, its utilization is expanding.

For example, Japanese Unexamined Patent Application Publication No. 2002-73247 discloses a portable information terminal which incorporates a tilt detection sensor. When the portable information terminal is tilted, the tilt detection sensor detects its tilt direction. For example, by operating a function switch provided on the portable information terminal in a tilted state, the cursor can be moved to the tilt direction.

SUMMARY OF TEE INVENTION

In remote controls for electronic units, the number of buttons disposed thereon is increasing due to the high functionality and the multi functionality of electronic units of the recent years. Therefore, the user has to look for a button for an operation from many buttons disposed on the remote control, which is troublesome for the user. In view of this, if the above-mentioned sensor such as the gravity sensor and the acceleration sensor is incorporated in a remote control so that the operation can be carried out by changing the posture of the remote control, the number of buttons can be reduced and a remote operation of the electronic unit can be intuitively carried out, which is very convenient for the user.

However, in the case where an input operation is carried out by utilizing the sensor incorporated in the remote control, unlike a case where the user operates the electronic unit by consciously pressing the button, there is a fear that the change of the posture is detected even when the user is not conscious and that the remote operation of the electronic unit is automatically or unintentionally carried out.

It is desirable to provide an operation terminal, an electronic unit, and an electronic unit system, which can reduce a possibility that, when a remote operation of the electronic unit is carried out such as by an orientation and a movement of the operation terminal, an operation is carried out when a user is not conscious.

An operation terminal according to an embodiment of the present disclosure includes: a posture detection section detecting a posture of the operation terminal, a change of the posture, or both thereof; a mode selection section selecting, based on a detection result of the posture detection section, an operation mode from a plurality of operation modes including a gesture mode and a non-gesture mode; and a transmission section sending a control command corresponding to the detection result of the posture detection section to an electronic unit when the gesture mode is currently selected.

As used herein, the wording such as "a posture, a change of the posture, or both thereof" is a broad concept including information obtained from a state of the posture of its own or a change in the state thereof. The wording such as "a posture, a change of the posture, or both thereof" includes, for example but not limited to, a stationary state of the posture of its own (orientation), presence or absence of the change of the posture, a direction of the change, an amount of the change, or a speed of the change (acceleration), or any combination thereof.

An electronic unit according to an embodiment of the present disclosure includes: a reception section receiving a control command as well as control command information from an operation terminal, in which the control command is generated based on a posture of the operation terminal, a change of the posture, or both thereof, and the control command information represents a relationship between the control command and contents of operation to be executed in response to the control command by the electronic unit; and a control section interpreting, based on the control command information, the control command received by the reception section, to carry out a predetermined processing.

An electronic unit system according to an embodiment of the present disclosure includes: an electronic unit; and an operation terminal performing an operation to allow the electronic unit to work. The operation terminal includes: a posture detection section detecting a posture of the operation terminal, a change of the posture, or both thereof; a mode selection section selecting, based on a detection result of the posture detection section, an operation mode from a plurality of operation modes including a gesture mode and a non-gesture mode; and a transmission section sending a control command corresponding to the detection result of the posture detection section to the electronic unit when the gesture mode is currently selected.

In the operation terminal, the electronic unit, and the electronic unit system of the embodiments of the present disclosure, the electronic unit is remotely operated such as by an orientation and a movement of the operation terminal. After switching to the gesture mode is carried out on the basis of the detection result from the posture detection section, the control command corresponding to the detection result is sent to the electronic unit, and then the electronic unit is operated on the basis of the control command.

Advantageously, the operation terminal is a mobile terminal.

Advantageously, while staying in the non-gesture mode, the mode selection section switches the operation modes from the non-gesture mode to the gesture mode when the detection result of the posture detection section is unlikely to occur in a normal use.

Advantageously, the mode selection section switches the operation modes from a current operation mode to a predetermined operation mode, when the posture detection section detects that the posture of the operation terminal is maintained in a state for more than a time period.

Advantageously, the operation terminal further include: a touch panel capturing information through a panel-touch operation; and a control command generation section generating the control command, based on both the detection result of the posture detection section and the information captured through the touch panel.

Advantageously, the plurality of operation modes include a plurality of gesture modes different from one another.

Advantageously, the transmission section sends control command information representing a relationship between the control command and contents of operation to be executed in response to the control command by the electronic unit.

Advantageously, the control command information further includes information related to the posture of the operation terminal, information related to the change of the posture, or both thereof.

Advantageously, the electronic unit further includes a display section performing a display, based on the control command information, and the control command information includes information of the posture of the operation terminal, information of the change of the posture, or both thereof.

According to the operation terminal, the electronic unit, and the electronic unit system of the embodiments of the present disclosure, the operation mode is switched to the gesture mode on the basis of the detection result of the posture detection section and then the electronic unit is remotely operated. Therefore, the possibility that the remote operation of the electronic unit is carried out when the user is not conscious can be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 15 is a table illustrating an exemplary configuration of a gesture motion correspondence table according to the electronic unit system shown in FIG. 14.

DETAILED DESCRIPTION OF THE PREFERRED EMBODIMENTS

Hereinafter, embodiments of the present disclosure will be described in detail with reference to the drawings.

It should be noted that, description will be made in the following order.

1. First embodiment
2. Second embodiment
3. Third embodiment
1. First embodiment
[Exemplary Configuration]
(Exemplary General Configuration)

Figure 1:
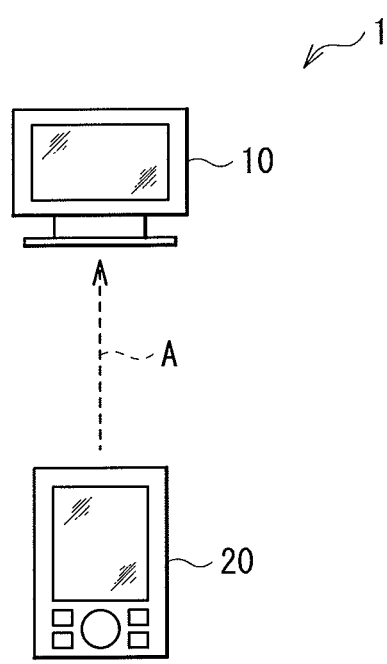
FIG. 1 is a configuration diagram illustrating an exemplary configuration of an electronic unit system according to a first embodiment of the present disclosure.

FIG. 1 illustrates an exemplary configuration of an electronic unit system according to a first embodiment of the present disclosure. It is to be noted that, since an operation terminal and an electronic unit according to embodiments of the present disclosure are embodied by the embodiments, the operation terminal and the electronic unit will also be described collectively.

An electronic unit system 1 includes a display device 10 and a mobile device 20. As described later, the display device 10 in this example is a display device which displays a television broadcast received at an antenna. The mobile device 20 is an electronic unit such as a mobile phone, a PDA (Personal Digital Assistant), and a portable music player, although it is not limited thereto. The mobile device 20 has a function of sending information to display device 10 through a communication mechanism A. The communication mechanism A is preferably a mechanism which is equipped in commonly-used display devices, and, for example, a wireless communication using an infrared ray is preferred, although it is not limited thereto. Also, the communication mechanism A may be wireless communications such as the wireless LAN (Local Area Network) and the Bluetooth as well as wire communications such as the LAN and the USB (Universal Serial Bus), although it is not limited thereto. As described later, the mobile device 20 includes a gravity sensor and a gyro sensor, and functions as a remote control which can operate the display device 10 by the posture of the mobile device 20 and a movement of the posture. In other words, by making a gesture motion with the mobile device 20 in hand, for example, the user can remotely operate the display device 10.

Figure 2:
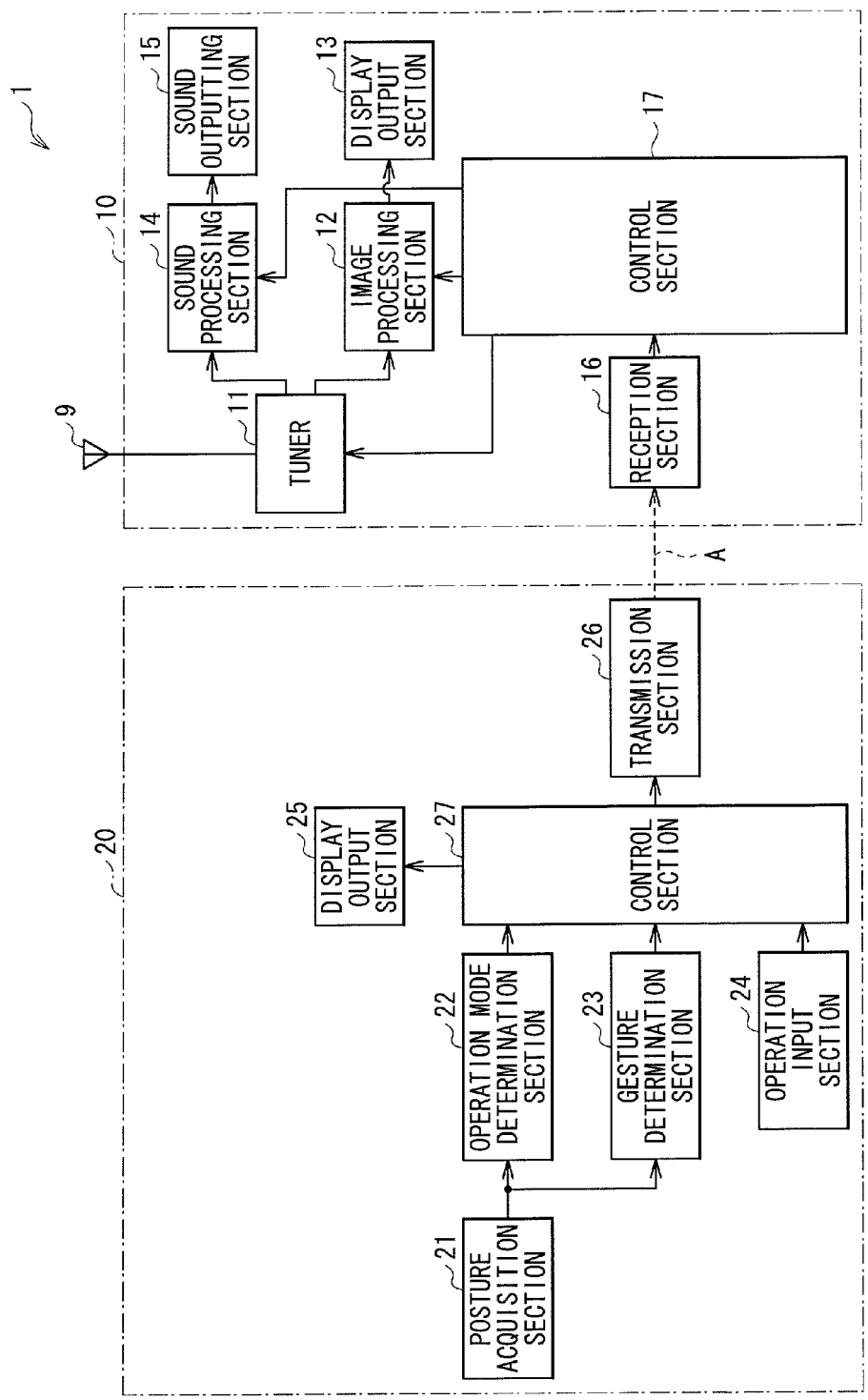
FIG. 2 is a block diagram illustrating an exemplary configuration of the electronic unit system shown in FIG. 1.

FIG. 2 illustrates an exemplary configuration of the mobile device 20 and the display device 10 of the electronic unit system 1.

The mobile device 20 includes a posture acquisition section 21, an operation mode determination section 22, a gesture determination section 23, an operation input section 24, a display output section 25, a transmission section 26, and a control section 27.

The posture acquisition section 21 includes the gravity sensor and the gyro sensor, and detects the posture and the movements of the posture of the mobile device 20. The gravity sensor detects an orientation (posture) of the mobile device 20 relative to gravity. The gyro sensor in this example detects an angular velocity of a rotation of the mobile device 20 and an acceleration of the movement of the mobile device 20. That is, the gyro sensor detects the movement of the posture.

The operation mode determination section 22 has a function of determining an operation mode on the basis of the posture of the mobile device 20 obtained by the posture acquisition section 21. The operation mode has a normal mode N (non-gesture mode) in which the remote operation of the display device 10 using the sensor is not carried out, and a gesture mode G in which the remote operation of the display device 10 using the sensor is carried out by using the gesture motion. The normal mode N in this example is a mode in which the remote operation of the display device 10 is carried out without using the sensor. It is to be noted that, the normal mode N may be a mode in which an operation irrelevant to the remote operation of the display device 10 is carried out. In that case, the normal mode N includes, in a case where the mobile device 20 is the mobile phone, a state in which the phone is in a standby mode, and in a case where the mobile device 20 is the portable music player, a state in which the music is being reproduced, for example. The operation mode determination section 22 distinguishes between the normal mode N and the gesture mode G, for example.

The gesture determination section 23 has a function of determining the gesture motion of the user on the basis of the posture and the movement of the posture of the mobile device 20 which are acquired by the posture acquisition section 21.

The operation input section 24 is an interface through which the user inputs information, and, in this example, includes mechanical buttons, a touch panel disposed in an overlapping fashion on the display output section 25, and the like. The display output section 25 displays states of the mobile device 20, instructions to the user, and the like. The transmission section 26 generates a control command by which the display device 10 is remotely operated, and sends the control command as a remote control signal by using the communication mechanism A. The remote control signal is used between the mobile device 20 and the commonly-used display devices. The control section 27 controls the circuit blocks thereof so that the circuit blocks operate in cooperation with one another.

The display device 10 includes a tuner 11, an image processing section 12, a display output section 13, a sound processing section 14, a sound outputting section 15, a reception section 16, and a control section 17.

The tuner 11 selects a desired signal from a broadcast wave received at the antenna 9, and outputs an image signal and a sound signal. The image processing section 12 has a function of subjecting the image signal supplied from the tuner 11 to an image signal processing such as a gamma correction. The display output section 13 carries out a displaying operation on the basis of the image signal processed in the image processing section 12. The sound processing section 14 has a function of subjecting the sound signal supplied from the tuner 11 to a sound signal processing such as a volume control and a surround-sound treatment. The sound outputting section 15 includes a speaker, for example, and outputs a sound on the basis of the sound signal processed in the sound processing section 14. The reception section 16 receives the remote control signal sent from the mobile device 20 using the communication mechanism A. The control section 17 has a function of controlling the circuit blocks thereof on the basis of the remote control signal received by the reception section 16.

By this configuration, in the mobile device 20, the operation mode determination section 22 determines the operation mode on the basis of the posture of the mobile device 20. In a case where the operation mode is the gesture mode G, when the user makes a gesture motion using the mobile device 20, the gesture determination section 23 determines the gesture motion, and then the remote control signal corresponding to the gesture motion is sent out. In the display device 10, various operations are carried out on the basis of the remote control signal.

Here, the mobile device 20 is an illustrative embodiment of the "operation terminal" according to the embodiments of the present disclosure. The display device 10 is an illustrative embodiment of the "electronic unit" according to the embodiments of the present disclosure. The posture acquisition section 21 is an illustrative embodiment of the "posture detection section" according to the embodiments of the present disclosure. The operation mode determination section 22 is an illustrative embodiment of the "mode selection section" according to the embodiments of the present disclosure.

[Operation and Function]

Now, an operation and a function of the electronic unit system 1 of the present embodiment will be described.

(Overview of General Operation)

In the mobile device 20, the posture acquisition section 21 detects the posture and the movement of the posture of the mobile device 20. The operation mode determination section 22 determines the operation mode (the normal mode N or the gesture mode G), on the basis of information supplied from the posture acquisition section 21. The gesture determination section 23 determines the gesture motion, on the basis of the information supplied from the posture acquisition section 21. The operation input section 24 receives an input of information by the user. The display output section 25 displays the states of the mobile device 20, the instructions for the user, and the like. The transmission section 26 generates a control command by which the display device 10 is remotely operated, and sends the control command as the remote control signal. The control section 27 controls the circuit blocks thereof so that the circuit blocks operate in cooperation with one another.

In the display device 10, the tuner 11 selects a desired signal from the broadcast wave received at the antenna 9, and outputs the image signal and the sound signal. The image processing section 12 subjects the image signal supplied from the tuner 11 to the image signal processing. The display output section 13 carries out the displaying operation on the basis of the image signal processed in the image processing section 12. The sound processing section 14 subjects the sound signal supplied from the tuner 11 to the sound signal processing. The sound outputting section 15 outputs the sound on the basis of the sound signal processed in the sound processing section 14. The reception section 16 receives the remote control signal from the mobile device 20. The control section 17 controls the circuit blocks thereof on the basis of the remote control signal received by the reception section 16.

(Specifics of Operation)

Figure 3:
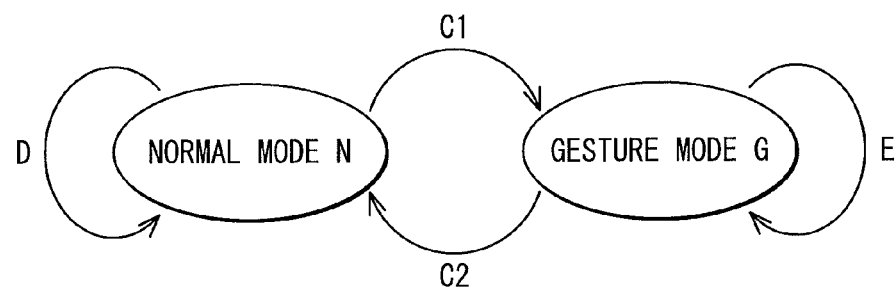
FIG. 3 is a state transition view illustrating an exemplary operation of the electronic unit system shown in FIG. 1.
Figure 4:
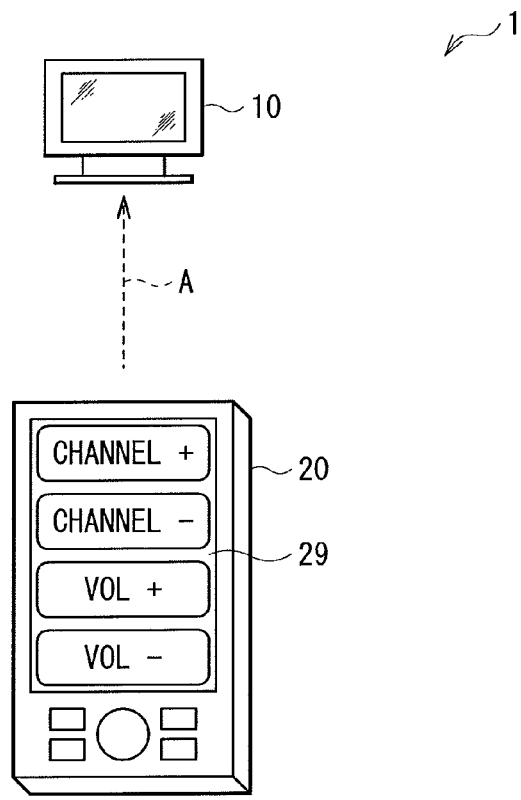
FIG. 4 is an explanatory view illustrating an exemplary operation of a normal mode N of the electronic unit system shown in FIG. 1.
Figure 5:
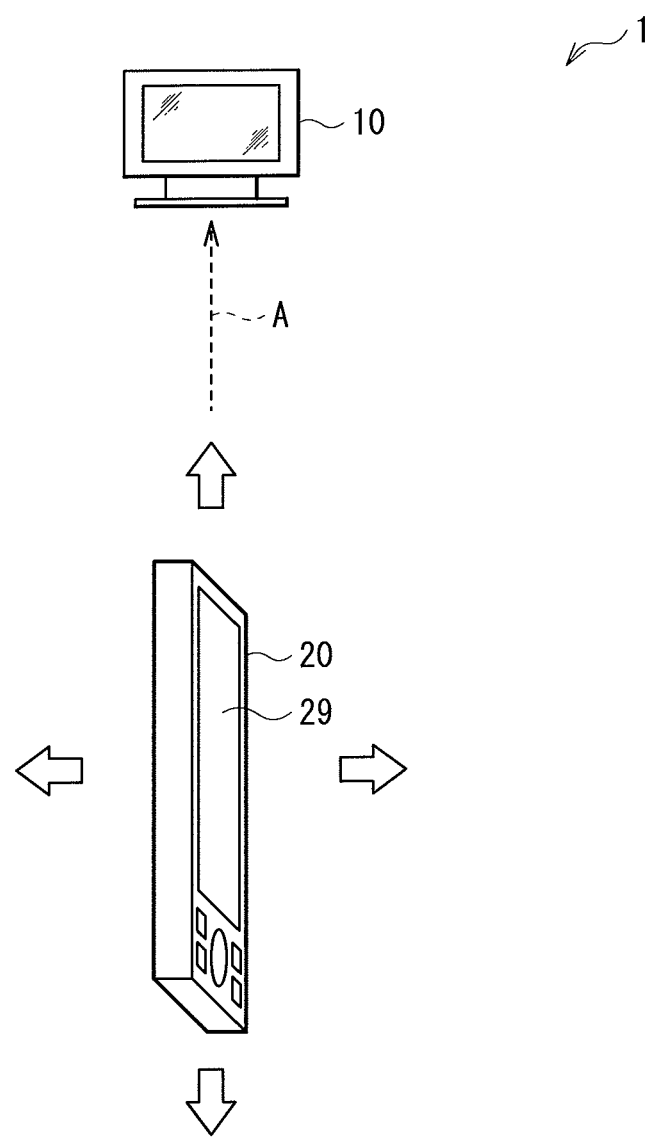
FIG. 5 is an explanatory view illustrating an exemplary operation of a gesture mode G of the electronic unit system shown in FIG. 1.

Referring to FIG. 3 to FIG. 5, each operation mode of the electronic unit system 1 and transitions between each operation mode will be described first.

FIG. 3 illustrates a state transition of the operation modes of the electronic unit system 1. FIG. 4 illustrates an exemplary operation of the electronic unit system 1 in the normal mode. FIG. 5 illustrates an exemplary operation of the electronic unit system 1 in the gesture mode.

As illustrated in FIG. 3, the electronic unit system 1 has two operation modes: the normal mode N and the gesture mode G. In the normal mode N, as illustrated in FIG. 4, a display screen 29 of the mobile device 20 is facing the user. In this example, buttons indicating functions of the display device 10 are displayed on the display screen 29, and the display device 10 can be remotely operated by the user by operating these buttons through the touch panel. In the gesture mode G, as illustrated in FIG. 5, the display screen 29 of the mobile device 20 is not facing the user. In other words, the mobile device 20 is set to operate in the gesture mode G when the mobile device 20 in the normal mode N is in a posture which is unlikely to occur in a normal use state. In FIG. 3, a transition C1 is a transition from the normal mode N to the gesture mode G. That is, the transition C1 is performed such that the posture of the mobile device 20 is changed from the state illustrated in FIG. 4 to the state illustrated in FIG. 5. Likewise, in FIG. 3, a transition C2 is a transition from the gesture mode G to the normal mode N. That is, the transition C2 is performed such that the posture of the mobile device 20 is changed from the state illustrated in FIG. 5 to the state illustrated in FIG. 4. In FIG. 3, a transition D corresponds to various operations in the normal mode N. For example, the transition D is performed by operating the buttons illustrated in FIG. 4. A transition E corresponds to various operations in the gesture mode G, and such operations include an operation in which the mobile device 20 is moved up, down, left and right while the posture of the mobile device 20 is maintained as illustrated in FIG. 5, for example.

As described below, one reason that the posture of the mobile device 20 is in the state as illustrated in FIG. 5 when the mode is switched from the normal mode N to the gesture mode G, is to reduce a possibility that the operation mode is accidentally or unintentionally switched when the user is not conscious.

Figure 6A:
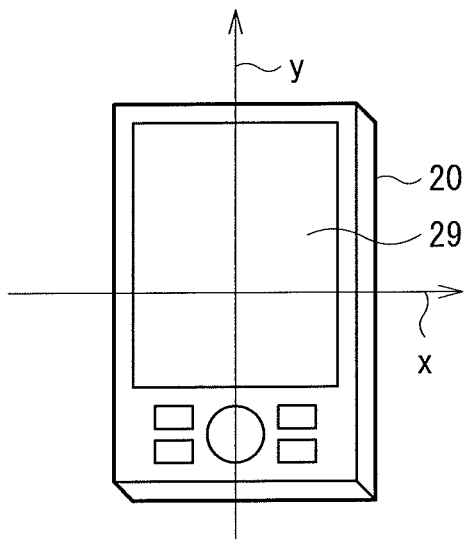
FIGS. 6A to 6C are explanatory views illustrating examples of a posture of a mobile device shown in FIG. 1.
Figure 6B:
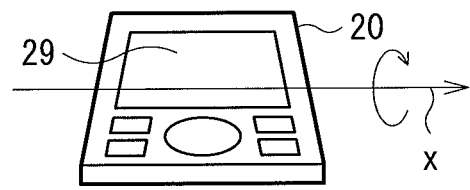
Figure 6C:
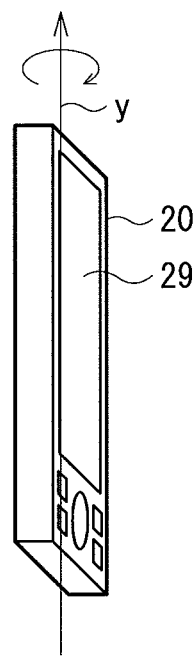

FIGS. 6A to 6C illustrate postures of the mobile device 20. FIG. 6A illustrates a case where the display screen 29 of the mobile device 20 is facing the user. FIG. 6B illustrates a case where the mobile device 20 is rotated around the x axis. FIG. 6C illustrates a case where the mobile device 20 is rotated around the y axis. The rotation around the x axis illustrated in FIG. 6B frequently occurs when the mobile device 20 is ordinarily operated. For example, such ordinary operation includes an operation of the touch panel and a hardware key. On the other hand, the rotation around the y axis illustrated in FIG. 6C is less likely to occur in comparison with the rotation around the x axis. That is, the posture which is rotated around the y axis is unlikely to occur in the normal use state in the normal mode N. In view of this, by switching to the gesture mode G when the posture of the mobile device 20 is the one which is unlikely to occur in the normal use state, the possibility that the operation mode is accidentally or unintentionally switched when the user is not conscious can be reduced. It is to be noted that, the above-mentioned posture which is unlikely to occur in the normal use state is postures other than a posture in which an operation screen is facing upward, for example. More specifically, the above-mentioned posture which is unlikely to occur in the normal use state is not limited to the posture in which the display screen 29 is facing the right side of the figure as illustrated in FIG. 6C, and may be a posture in which the display screen 29 is facing the left side or the reverse side of the figure.

In gesture mode G, as described above, the user holds the mobile device 20 and moves the mobile device 20 up, down, left and right, for example. In this case, as illustrated in FIG. 6C, in comparison with the mobile device 20 rotated around the x axis (FIG. 6B), the mobile device 20 rotated around the y axis is easier to hold. That is, for the user, it is easier to move the mobile device 20 rotated around the y axis (illustrated in FIG. 6C) than to move the mobile device 20 rotated around the x axis (illustrated in FIG. 6B). For this reason, from the viewpoint of user-friendliness, in the gesture mode G, the postures illustrated in FIGS. 5 and 6C are preferred, although it is not limited thereto.

Next, the switching of the operation mode in the mobile device 20 will be specifically described.

Figure 7:
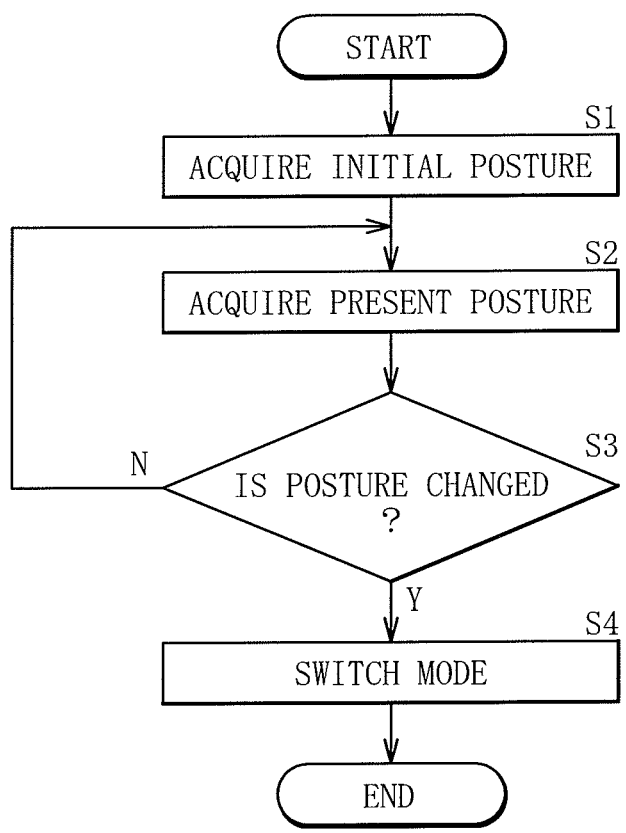
FIG. 7 is a flow chart illustrating an exemplary operation of the electronic unit system shown in FIG. 1.

FIG. 7 is a flowchart illustrating the switching of the operation mode. In the mobile device 20, its posture may be detected at a predetermined time interval and when the posture is changed, the switching of the mode is carried out. In the following, each step in the flow is specifically described.

Firstly, the mobile device 20 acquires an initial posture (step S1). More specifically, the posture acquisition section 21 acquires the posture of the mobile device 20, and the operation mode determination section 22 determines the operation mode at that time (initial operation mode) on the basis of the acquired posture.

Next, the mobile device 20 acquires a present posture (step S2). More specifically, in the same way as in step S1, the posture acquisition section 21 acquires the posture of the mobile device 20, and the operation mode determination section 22 determines the operation mode at that time (present operation mode) on the basis of the acquired posture.

Next, the mobile device 20 checks whether the posture is changed (step S3). More specifically, the operation mode determination section 22 checks whether the operation mode determined in step S1 is different from the operation mode determined in the step S2. That is, in step S3, whether the present posture (step S2) is changed from the initial posture (step S1) is checked. When the operation mode is different between the step S1 and step S2, the flow proceeds to step S4. When there is no change in the operation mode, the flow returns to step S2.

Next, the mobile device 20 switches the mode (step S4). More specifically, in the case where the operation mode is switched from the normal mode N to the gesture mode G, each time the gesture motion is determined in the gesture determination section 23 and the information regarding the gesture motion is supplied from the gesture determination section 23, the control section 27 supplies the information to the transmission section 26. Then, the transmission section generates, each time the information is supplied, the control command and sends the control command as the remote control signal. On the other hand, in the case where the operation mode is switched from the gesture mode G to the normal mode N, the control section 27 does not supply to the transmission section 26 the information regarding the gesture motion supplied from the gesture determination section 23. Alternatively, the control section 27 may stop the operation of the gesture determination section 23. It is to be noted that, when the operation mode is switched, the mobile device 20 may output a sound or may operate a vibrator, for example, to notify the user that the switching of the operation mode is successfully carried out.

Then the flow is ended. Thereafter, in the case where the mobile device 20 is in the gesture mode G, the user can remotely operate the display device 10 by moving the mobile device 20 up, down, left, and right as illustrated in FIG. 5, for example. On the other hand, in the case where the mobile device 20 is in the normal mode N, the user can remotely operate the display device 10 by operating the buttons displayed on the touch panel as illustrated in FIG. 4, for example.

Application Example

Figure 8A:
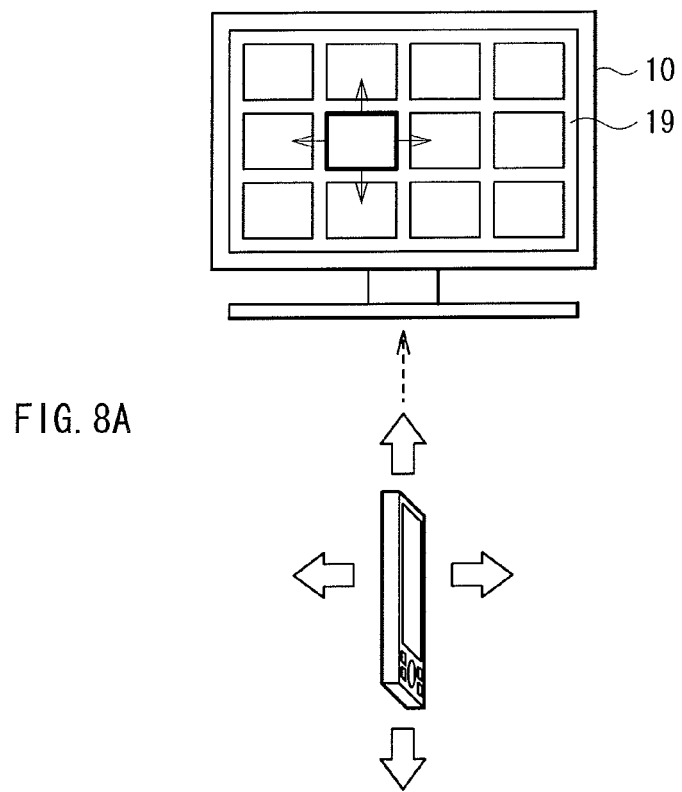
FIGS. 8A and 8B are explanatory views illustrating another exemplary operation of the electronic unit system shown in FIG. 1.
Figure 8B:
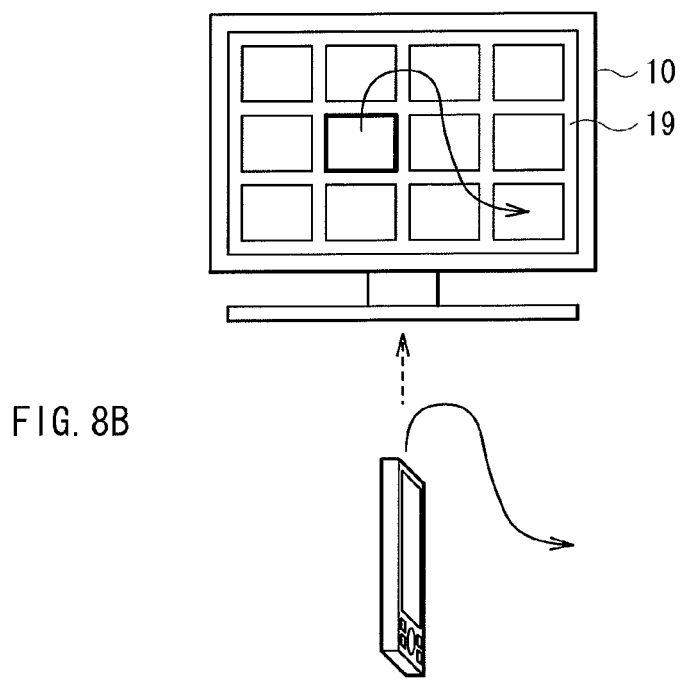

FIGS. 8A and 8B illustrate application examples of the gesture motion. FIG. 8A illustrates an operation using up, down, left and right motions, and FIG. 8B illustrates an operation by a free cursor.

In the electronic unit system 1, by moving the mobile device 20 up, down, left, and right as illustrated in FIG. 8A, the remote operation of the display device 10 can be carried out. Thereby, the electronic program guide (EPG) displayed on the display device 10 can be operated, for example. It is to be noted that the gesture motion is not limited to the operation accompanied by the display on the display device 10. For example, a channel of the display device 10 may be changed by a horizontal movement, and the sound volume may be changed by a vertical movement. Further, the direction of the gesture motion is not limited to the up, down, left and right, and a diagonal movement may be included, for example.

In addition, in the electronic unit system 1, by moving the mobile device 20 as illustrated in FIG. 8B, for example, a function of free cursor in which a position of a cursor displayed on the display device 10 can be optionally set can be implemented.

[Effect]

As described above, in the present embodiment, since the two modes of the normal mode and the gesture mode are provided and they can be switched to one another, the user can switch the mode to the gesture mode only when the user wants to carry out the remote operation using the gesture motion. Therefore, the possibility that the remote operation is carried out when the user is not conscious can be reduced.

In addition, in the present embodiment, since the switching of the operation mode is carried out when the posture of the mobile device is in a posture which is unlikely to occur in the normal use state, the possibility that the operation mode is accidentally or unintentionally switched when the user is not conscious can be reduced.

In addition, in the present embodiment, since the mobile device employs the commonly-used communication mechanism A and remote control signal, it is not necessary for the display device to have a special function and the display device may be a commonly-used display device.

Modification Example 1-1

In the above-mentioned embodiment, the switching of the operation mode is carried out when the change of the posture of the mobile device 20 is detected. However, this is not restrictive. An example is described below.

Figure 9:
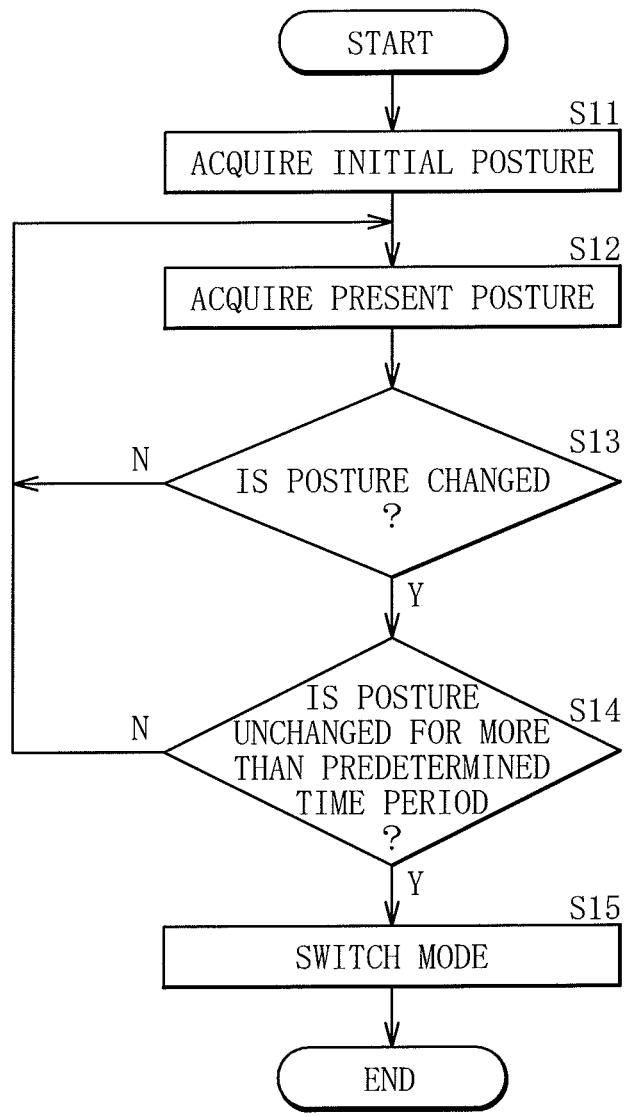
FIG. 9 is a flow chart illustrating an exemplary operation of the electronic unit system according to a first modification example of the first embodiment of the present disclosure.

FIG. 9 is a flow chart illustrating a case where the switching of the operation mode is carried out according to a present modification example. Operations in steps S11 to S13 and step S15 are the same as those in steps S1 to S3 and step S4 according to the above-mentioned first embodiment (FIG. 7), respectively. That is, the flow chart of the present modification example is a flow chart in which step S14 is added to the flow illustrated in FIG. 7. Below, step S14 is described.

In step S14, the mobile device 20 checks whether the posture of the mobile device 20 is unchanged (is the same) for more than a predetermined time period. More specifically, the operation mode determination section 22 checks, by using determination results of previous operation modes determined in steps S11 and S12, whether the posture of the mobile device 20 is unchanged after the change of the posture for more than the predetermined time period (e.g., one second or more). When the posture is unchanged for more than the predetermined time period, the flow proceeds to step S15, and when the posture is changed (is not the same posture) in the predetermined time period, the flow returns to step S12.

As above, the switching of the operation mode is carried out after the posture is kept (is kept unchanged) from the previous change of the posture for the predetermined time period. Thus, there is no switching of the mode caused by an instantaneous change in the posture and the possibility that the operation mode is accidentally or unintentionally switched when the user is not conscious can be reduced.

Modification Example 1-2

Figure 10:
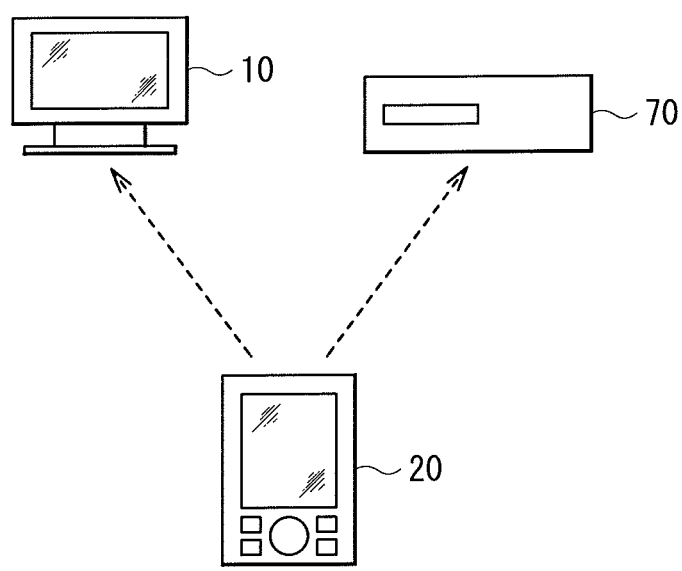
FIG. 10 is a configuration diagram illustrating an exemplary configuration of the electronic unit system according to a second modification example of the first embodiment of the present disclosure.

In the above-mentioned embodiment, in the gesture mode G, the mobile device 20 remotely operates only the display device 10. However, this is not restrictive. Alternatively, two devices, the display device 10 and a recording and reproducing device 70, may be remotely operated by the mobile device 20 as illustrated in FIG. 10. In this case, the two devices may be operated in the gesture mode G such that, for example, a fast-forward and a rewind of the recording and reproducing device 70 are carried out by moving the mobile device 20 left and right, and that an adjustment of a sound volume of the display device 10 is carried out by moving the mobile device 20 up and down.

Modification Example 1-3

In the above-mentioned embodiment, in the gesture mode G, the mobile device 20 remotely operates the display device 10 only by the gesture motion. However, this is not restrictive. For example, a touch panel (operation input section 24) disposed in an overlapping fashion on the display output section 25 of the mobile device 20 may be used. An example is described below.

Figure 11A:
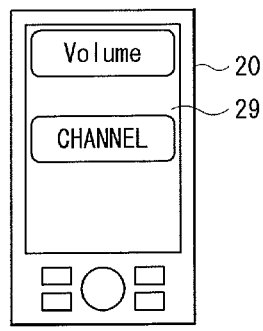
FIGS. 11A and 11B are explanatory views illustrating an exemplary operation of the mobile device according to a third modification example of the first embodiment of the present disclosure.
Figure 11B:
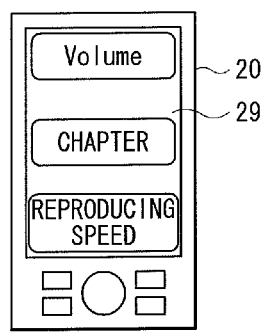

FIGS. 11A and 11B illustrate exemplary displays of the display output section 25 in the gesture mode G according to a present modification example. FIG. 11A illustrates a case in which the display device 10 is remotely operated, and FIG. 11B illustrates, in relation to the modification example 1-2, a case in which the display device 10 and the recording and reproducing device 70 are remotely operated. In the present modification example, as illustrated in FIGS. 11A and 11B, items by which the devices are operated are displayed on the display screen 29, and the user carries out the gesture motion while pressing the buttons of the items in order to remotely operate the devices. Namely, in this example, items for a sound volume operation and a channel operation of the display device 10, and items for a chapter operation and a reproducing speed operation of the recording and reproducing device 70 are displayed, and instructions for increasing or decreasing the items (e.g., instructions for increasing or decreasing the sound volume) are carried out by the gesture motion. Thus, the user can intuitively carry out various kinds of operations.

Modification Example 1-4

In the above-mentioned embodiment, the operation mode includes the two modes of the normal mode N and the gesture mode G. However, this is not restrictive. Alternatively, for example, the operation mode may include three modes of a normal mode N and two gesture modes G1 and G2.

Figure 12:
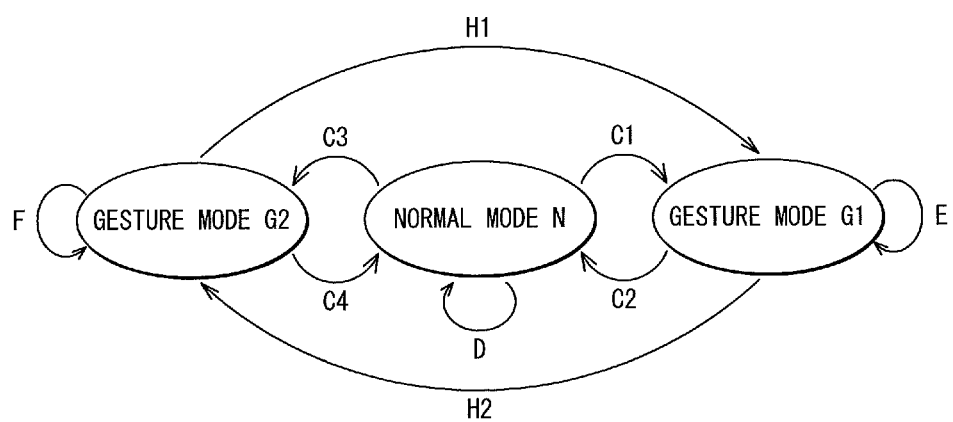
FIG. 12 is a state transition view illustrating an exemplary operation of the electronic unit system according to a fourth modification example of the first embodiment of the present disclosure.

FIG. 12 is a state transition view illustrating an operation mode of an electronic unit system according to a present modification example. The electronic unit system has three operation modes of the normal mode N and the two gesture modes G1 and G2. The switching operation of the operation mode may be carried out such that, for example, the mode is switched to the gesture mode G1 when the display screen 29 is directed to the right side as illustrated in FIG. 5, and that the mode is switched to the gesture mode G2 when the display screen 29 is directed to the left side. Alternatively, for example, by using the gyro sensor of the posture acquisition section 21, as illustrate in FIG. 6C, the mode may be switched to the gesture mode G1 with a rotation around the y axis in a positive direction, and the mode may be switched to the gesture mode G2 with a rotation in a negative direction. The gesture mode G1 and the gesture mode G2 can be separately used such that, for example, a frequently-used function is operated in the gesture mode G1, and that a function which is not frequently used is operated in the gesture mode G2. Further, in a case where a plurality of devices are operated as in the modification example 1-2, the operations may be carried out such that the operation of the display device 10 is carried out in the gesture mode G1, and that the operation of the recording and reproducing device 70 is carried out in the gesture mode G2, for example.

Other Modification Examples

In the above-mentioned embodiment, the mobile device 20 remotely operates the display device 10. However, this is not restrictive and any electronic unit having the communication mechanism A may be remotely operated.

2. Second Embodiment

Next, an electronic unit system 2 according to a second embodiment of the present disclosure will be described. In the first embodiment described above, the mobile device 20 sends the remote control signal by using the communication mechanism A equipped in the commonly-used display device. In the present embodiment, alternatively, a remote control signal including a unique control command is sent to a dedicated display device by using a unique communication mechanism. It is to be noted that, the same reference numerals are attached to the same components as those of the above-mentioned electronic unit system 1 according to the first embodiment, and description thereof is appropriately omitted.

Figure 13:
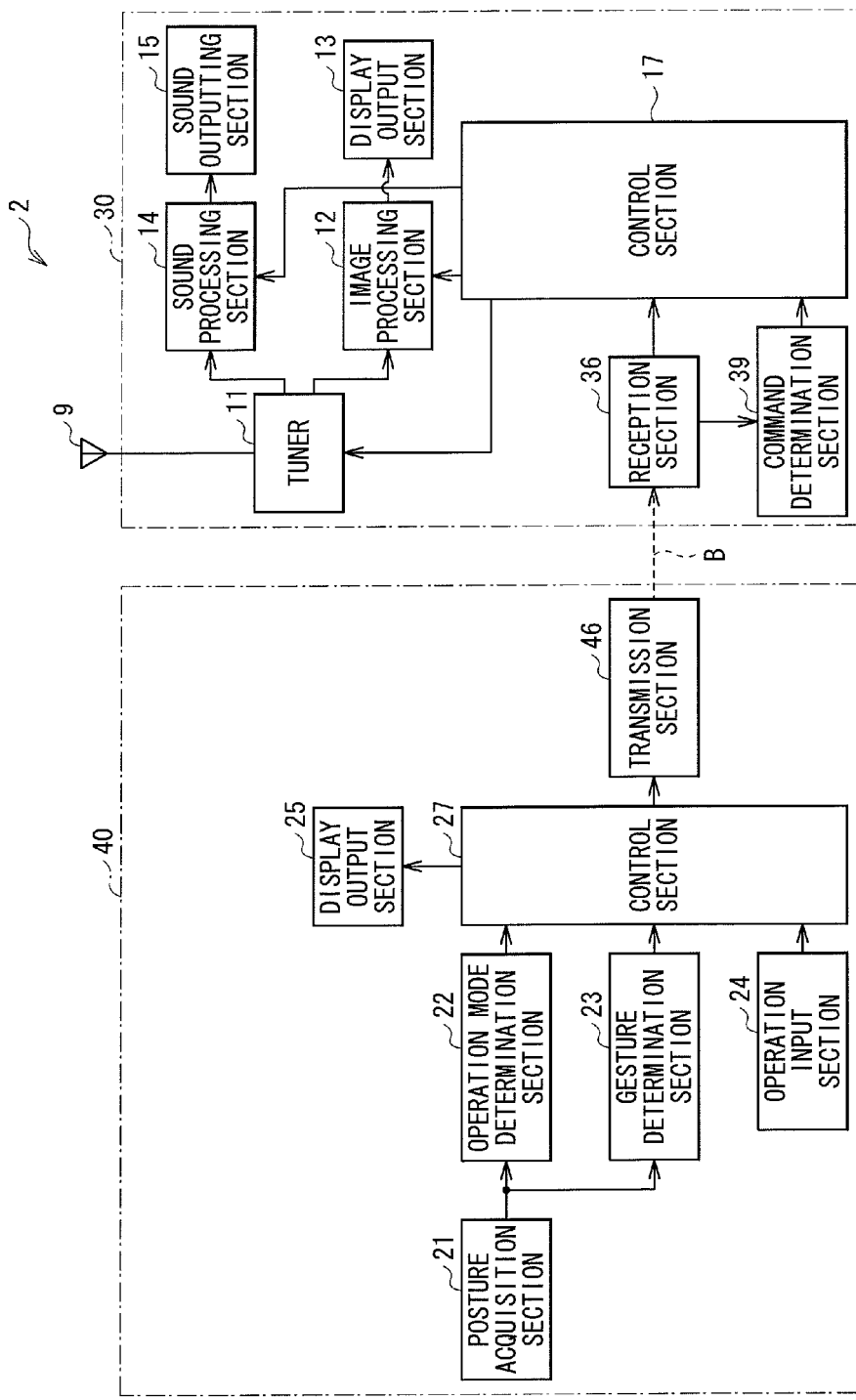
FIG. 13 is a block diagram illustrating an exemplary configuration of the electronic unit system according to a second embodiment of the present disclosure.

FIG. 13 illustrates an exemplary configuration of the electronic unit system 2 according to a present modification example. The electronic unit system 2 includes a mobile device 40 and a display device 30.

The mobile device 40 includes a transmission section 46. The transmission section 46 generates a unique control command and sends the unique control command as a remote control signal by using a communication mechanism B. The unique control command is a command which sends only information indicating that the mobile device 40 is moved right when the mobile device 40 is moved right in the gesture mode G, for example. More specifically, in this example, only the information concerning an operation of the mobile device (gesture motion) is included in the unique control command while information concerning an operation of display device 30 is not included, and as described later, in the display device 30, the information concerning the operation of the mobile device 40 is converted to the information concerning the operation of the display device 30. As the communication mechanism B, wireless communications such as the wireless LAN (Local Area Network), the Bluetooth, and the infrared ray, as well as wire communications such as the LAN and the USB (Universal Serial Bus) can be used.

The display device 30 includes a reception section and a command determination section 39. The reception section 36 receives, from the transmission section 46 of the mobile device 40, the remote control signal including the unique control command. The command determination section 39 has a function of analyzing the received unique control command on the basis of a previously defined correspondence relationship between the operation of (manipulation of) the mobile device 40 and the operation (contents of the operation) of the display device 30, and supplying the result of the analysis to the control section 17.

By this configuration, when the user carries out the gesture motion with the mobile device 40, the mobile device 40 sends the unique control command indicating the information of the gesture motion. In the display device 30, the command determination section 39 analyzes the received control command on the basis of the above-mentioned correspondence relationship, and the display device 30 carries out the operation corresponding to the control command.

As described above, in the present embodiment, since the information of the operation of the mobile device is directly sent to the display device, a load of the mobile device can be reduced. Other effects are the same as those of the above-mentioned first embodiment.

3. Third Embodiment

Next, an electronic unit system 3 according to a third embodiment of the present disclosure will be described. The electronic unit system 3 of the present embodiment has a display device which displays on the screen the correspondence relationship between the gesture motion of the mobile device and the operation (contents of the operation) of the display device. It is to be noted that, the same reference numerals are attached to the same components as those of the above-mentioned electronic unit system 1 according to the first embodiment and the above-mentioned electronic unit system 2 according to the second embodiment, and description thereof is appropriately omitted.

Figure 14:
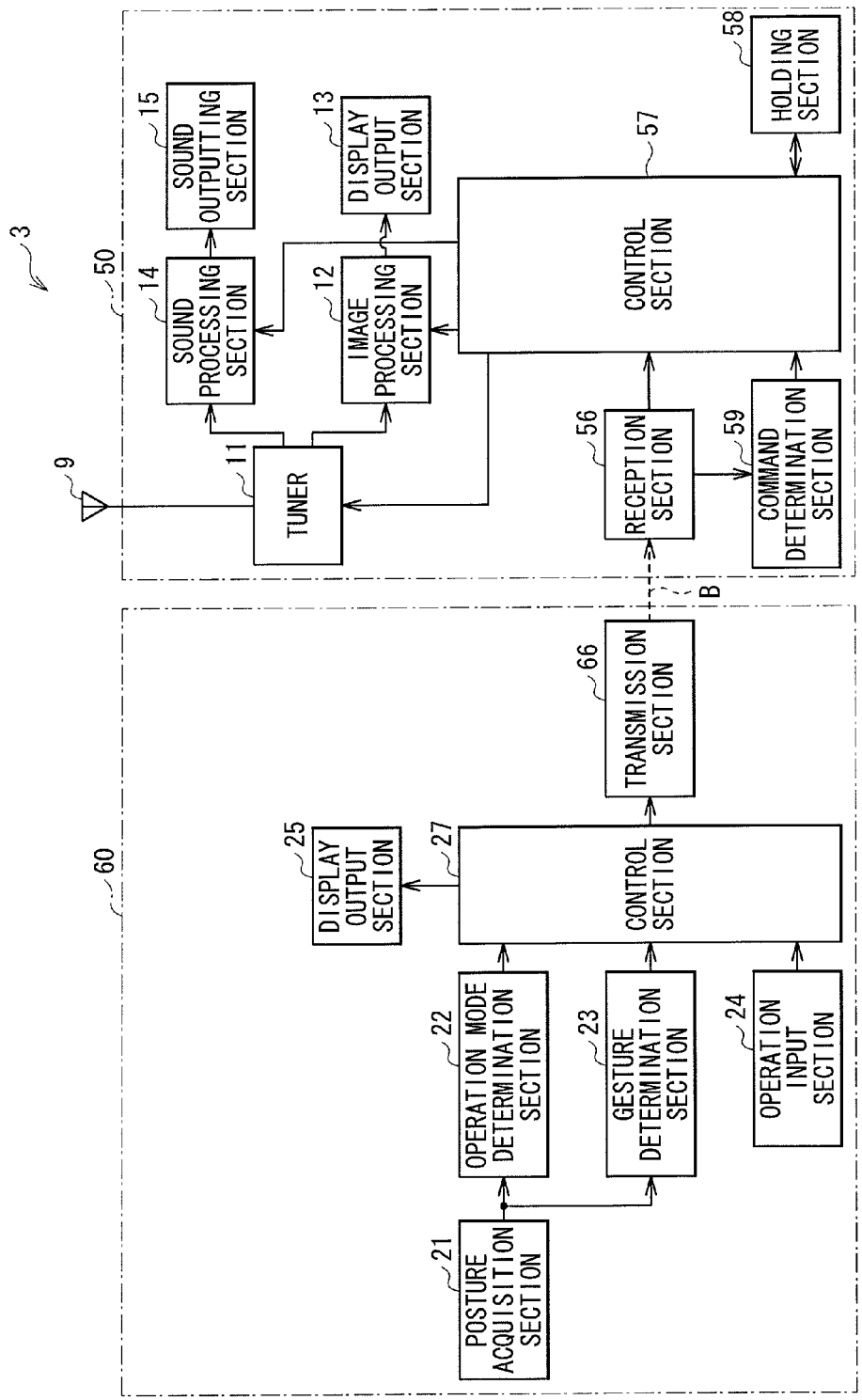
FIG. 14 is a block diagram illustrating an exemplary configuration of the electronic unit system according to a third embodiment of the present disclosure.

FIG. 14 illustrates an exemplary configuration of the electronic unit system 3. The electronic unit system 3 includes a mobile device 60 and a display device 50.

The mobile device 60 includes a transmission section 66. The transmission section 66 sends, at the time of the switching from the normal mode N to the gesture mode G and the like, for example, a gesture motion correspondence table TG (described later). It is to be noted that, the timing of sending the gesture motion correspondence table TG is not limited thereto. For example, the gesture motion correspondence table TG may be sent each time the display device 50 is operated by using the mobile device 60. More specifically, the gesture motion correspondence table TG may be sent at a timing where an operation of up, down, left and right is instructed by using the mobile device 60 when the display device 50 displays an electronic program guide, and also may be sent at a timing where the sound volume or channel is changed by using the mobile device 60 when a television program is displayed, for example.

FIG. 15 illustrates an exemplary configuration of the gesture motion correspondence table TG. The gesture motion correspondence table TG describes therein a correspondence relationship among gesture motions in the gesture mode G, control commands actually sent from the mobile device 60 in each gesture motion, and operations (contents of the operations) of the display device 50 upon reception of the control command. After sending the gesture motion correspondence table TG to the display device 50 in advance, the mobile device 60 sends to the display device 50 the remote control signal including the unique control command. Thus, the display device 50 can recognize the specifics of the instruction content of the unique control command.

The display device 50 includes a reception section 56, a holding section 58, a command determination section 59, and a control section 57. The reception section 56 receives the remote control signal including the unique control command from the transmission section 66 of the mobile device 60. The holding section 58 holds the gesture motion correspondence table TG received by the reception section 56. The command determination section 59 has a function of analyzing the received unique control command on the basis of the gesture motion correspondence table TG, and supplying the result of the analysis to the control section 57. In addition to the functions of the control section 17 of the above-mentioned first embodiment, the control section 57 generates an operation (manipulation) guide screen 71 (described later) on the basis of the gesture motion correspondence table TG when the mobile device 60 operates in the gesture mode G, and controls the image processing section 12 to display the operation guide screen 71 on the display output section 13.

Figure 16:
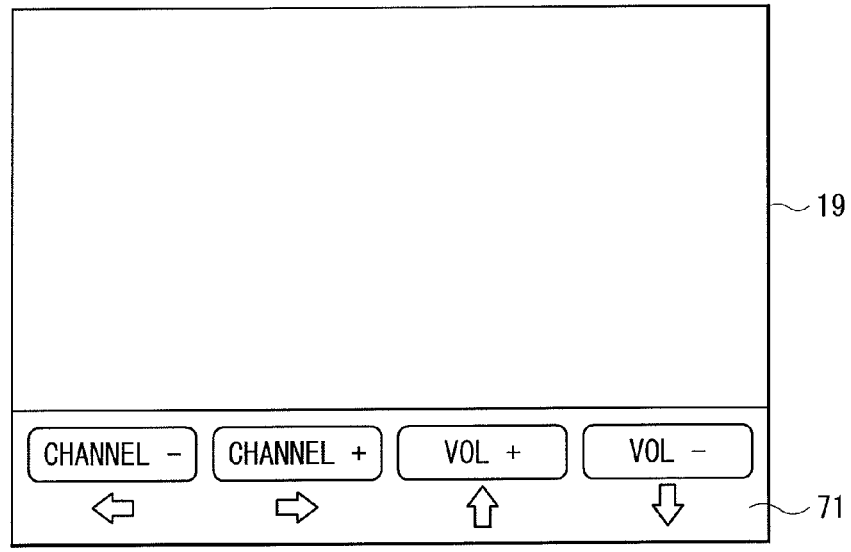
FIG. 16 is an explanatory view illustrating an exemplary display of the electronic unit system shown in FIG. 14.

FIG. 16 illustrates an exemplary display of the operation guide screen 71. The operation guide screen 71 shows a correspondence relationship between gesture motions of the mobile device 60 and operations (contents of the operations) of the display device. Thereby, there is no need for the user to memorize all the gesture motions, and the remote operation of the display device can be carried out more easily. In particular, in a case where the user, who uses the electronic unit system 3 for the first time, learns the gesture motion, the burden of learning the gesture motion can be reduced. It is to be noted that, the operation guide screen 71 may be displayed at any time in the gesture mode G. Also, the display or non-display of the operation guide screen 71 may be selected.

The gesture motion correspondence table TG is an illustrative embodiment of the "control command information" according to the embodiments of the present disclosure.

According to this configuration, the display device 50 generates and displays the operation guide screen 71 on the basis of the previously-received gesture motion correspondence table TG. Then, the user moves up the mobile device 60 when the user wants to increase the sound volume of the display device 50, for example. Then, the mobile device 60 generates and sends an unique control command indicating the up movement. In the display device 50, the command determination section 59 determines, by comparing the received control command with the gesture motion correspondence table TG, whether the control command is the instructions for increasing the sound volume.

As described, in the present embodiment, the mobile device sends the gesture motion correspondence table TG to the display device so that the display device can recognize the relationship between the gesture motion and the operation (contents of the operation) of the display device, and with the display of the information indicating the relationship, the user can remotely operate the display device more easily. Other effects are the same as those of the above-mentioned first and second embodiments.

Modification Example 3-1

Figure 17:
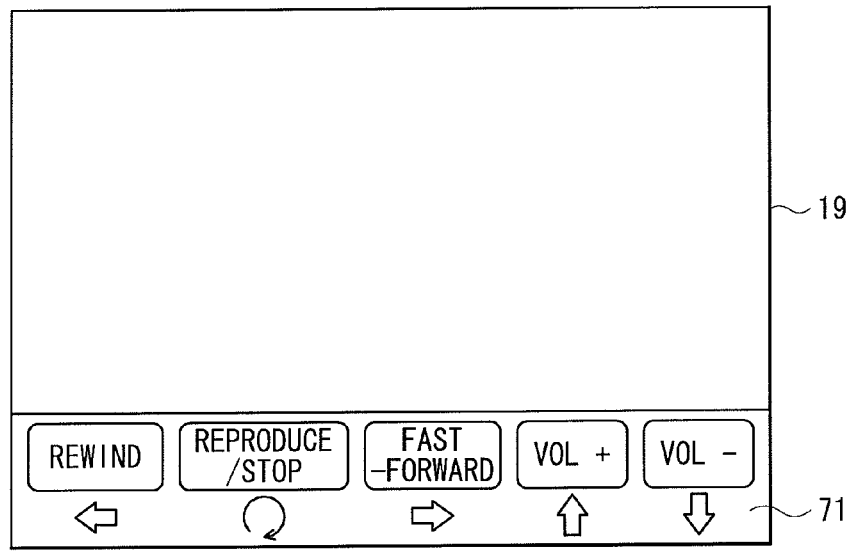
FIG. 17 is an explanatory view illustrating an exemplary display of the electronic unit system according to a modification example of the third embodiment of the present disclosure.

In the above-mentioned embodiment, the mobile device remotely operates only the display device 50. However, this is not restrictive. For example, the mobile device 60 may operate the recording and reproducing device 70 in addition to the display device 50. FIG. 17 illustrates an exemplary display of the operation guide screen 71 of a present modification example. In this case, for example, a fast-forward and a rewind of the recording and reproducing device 70 may be carried out by moving the mobile device 60 left and right; a reproduction and a stop of the recording and reproducing device 70 may be carried out by moving the mobile device 60 in a circular motion; and an adjustment of the sound volume of the display device 50 may be carried out by moving the device up and down.

Modification Example 3-2

In the above-mentioned embodiment, the display device 50 generates the operation guide screen 71 on the basis of the received gesture motion correspondence table TG. However, this is not restrictive. In addition thereto, in accordance with a state of the display device 50 and a content displayed on the display device 50, the gesture motion displayed on the operation guide screen 71 may be changed, for example. More specifically, it is also practicable that, for example, the mobile device 60 sends different gesture motion correspondence table TGs according to whether a television program is to be displayed or an electronic program guide is to be displayed, so that the display device 50 displays the operation guide screen 71 on the basis of the gesture motion correspondence table TG thus received. In addition, for example, it is also practicable that the mobile device 60 sends different gesture motion correspondence table TGs according to whether the television program is to be displayed or the Blu-ray Disc (registered trademark) is to be reproduced, so that the display device 50 displays the operation guide screen 71 on the basis of the gesture motion correspondence table TG thus received.

Although the present disclosure has been described based on the embodiments and the modification examples, the present disclosure is not limited to the embodiments and the modification examples and various modifications can be made.

For example, in the above-mentioned embodiments, the mobile device has the display output section. However, this is not restrictive. Alternatively, a mobile device which does not have the display output section may be adopted. In this case, the mobile device may be a remote control by which the display device is remotely operated by using an infrared ray, for example. Also in this case, the above-mentioned effects can be obtained such that, the orientation of the remote control is changed as illustrated in FIGS. 6A to 6C; then the posture acquisition section 21 detects the posture and the movement of the posture; and then the operation mode is switched from the normal mode to the gesture mode.

Further, for example, in the above-mentioned embodiments, the operation mode determination section determines the operation mode on the basis of the posture of the mobile device acquired by the posture acquisition section. However, this is not restrictive. Alternatively, for example, the operation mode determination section may determine the operation mode on the basis of only the movement of the posture of the mobile device or on the basis of both the posture of the mobile device and the movement of the posture of the mobile device. In either case, if the posture and the movement of the posture of the mobile device for determining the operation mode are those which are unlikely to occur in the normal use state in the normal mode N, the possibility that the operation mode is accidentally or unintentionally switched when the user is not conscious can be reduced. An example of the case where the operation mode is determined on the basis of only the movement of the posture of the mobile device is such that, for example, if the mobile device is strongly shaken predetermined times or the mobile device is rotated by a predetermined manner, then the mobile device detects the movement to determine the operation mode.

Further, for example, in the above-mentioned second and third embodiments, as in the above-mentioned first embodiment, the switching operation of the operation mode may be carried out when the posture of the mobile device is kept (kept unchanged) from the previous change of the posture for more than the predetermined time period.

Further, for example, in the above-mentioned second and third embodiments, as in the above-mentioned first embodiment, the mobile device 20 may remotely operate the display device 10 by using the touch panel disposed in an overlapping fashion on the display output section of the mobile device.

Further, for example, in the above-mentioned second and third embodiments, as in the above-mentioned first embodiment, the operation mode may include the three modes of the normal mode N and the two gesture modes G1 and G2.

It should be understood by those skilled in the art that various modifications, combinations, sub-combinations and alterations may occur depending on design requirements and other factors insofar as they are within the scope of the appended claims or the equivalents thereof.

What is claimed is:

1. An operation terminal comprising:
a mode selection section to select an operation mode from a plurality of operation modes including a gesture mode and a non-gesture mode;
a plurality of input sections to accept a plurality of types of inputs, in which each type of input is different from each other, and in which one type of input is a non-gesture input for use in the non-gesture mode wherein a user utilizes a button to select a desired operation without utilizing a posture or a change in posture of the operational terminal and another type of input is a gesture input for use in the gesture mode wherein the user utilizes one or both of the posture and the change in posture of the operation terminal to select a desired operation without utilizing any buttons; and
a transmission section to send a control command corresponding to at least one of the gesture input or the non-gesture input,
in which one of the input sections is an operation input section having a display screen with a touch panel disposed in an overlapping manner thereon and a number of buttons associated therewith to accept a desired non-gesture input from the user by use of a respective button in which the number of buttons are one or both of physical type buttons or touch type buttons, and another of the input sections is a gesture input section which includes (i) a posture detection section to detect the posture of the operation terminal, the change of the posture, or both thereof and (ii) a gesture determination section to determine a respective gesture input made by the user of said operation terminal based on a detection result of the posture detection section, and
in which when the non-gesture mode is currently selected the mode selection section automatically switches the operation mode from the non-gesture mode to the gesture mode when a detection result of the posture detection section indicates a change in posture to a first new posture in which the display screen and touch panel are arranged so as not to face the user and have remained in the first new posture for a predetermined period of time, and when the gesture mode is currently selected the mode selection section automatically switches the operation mode from the gesture mode to the non-gesture mode when a detection result of the posture detection section indicates a change in posture to a second new posture in which the display screen and touch panel are arranged so as to face the user and have remained in the second new posture for a predetermined period of time.

2. The operation terminal according to claim 1, wherein the operation terminal is a mobile terminal.

3. The operation terminal according to claim 2, in which the touch panel is configured to capture information through a panel-touch operation; and further comprising a control command generation section generating the control command, based on both a detection result of the posture detection section and the information captured through the touch panel.

4. The operation terminal according to claim 1, wherein the plurality of operation modes include a plurality of gesture modes different from one another.

5. The operation terminal according to claim 1, wherein the transmission section sends control command information representing a relationship between the control command and contents of operation to be executed in response to the control command.

6. The operation terminal according to claim 5, wherein the control command information further includes information related to the posture of the operation terminal, information related to the change of the posture, or both thereof.

7. The operation terminal according to claim 1, in which the gesture input section determines the respective gesture input made by the user without using the touch panel.

8. The operation terminal according to claim 1, in which the predetermined period of time is one second or more.

9. An electronic unit system comprising:
an electronic unit; and
an operation terminal performing an operation to allow the electronic unit to work, the operation terminal including:
a mode selection section to select an operation mode from a plurality of operation modes including a gesture mode and a non-gesture mode;
a plurality of input sections to accept a plurality of types of inputs, in which each type of input is different from each other, and in which one type of input is a non-gesture input for use in the non-gesture mode wherein a user utilizes a button to select a desired operation without utilizing a posture or a change in posture of the operational terminal and another type of input is a gesture input for use in the gesture mode wherein the user utilizes one or both of the posture and the change in posture of the operation terminal to select a desired operation without utilizes any buttons; and
a transmission section to send a control command corresponding to at least one of the gesture input or the non-gesture input, in which one of the input sections is an operation input section having a display screen with a touch panel disposed in an overlapping manner thereon and a number of buttons associated therewith to accept a desired non-gesture input from the user by use of a respective button in which the number of buttons are one or both of physical type buttons or touch type buttons, and another of the input sections is a gesture input section which includes (i) a posture detection section to detect the posture of the operation terminal, the change of the posture, or both thereof and (ii) a gesture determination section to determine a respective gesture input made by the user of said operation terminal based on a detection result of the posture detection section, and in which when the non-gesture mode is currently selected the mode selection section automatically switches the operation mode from the non-gesture mode to the gesture mode when a detection result of the posture detection section indicates a change in posture to a first new posture in which the display screen and touch panel are arranged so as not to face the user and have remained in the first new posture for a predetermined period of time, and when the gesture mode is currently selected the mode selection section automatically switches the operation mode from the gesture mode to the non-gesture mode when a detection result of the posture detection section indicates a change in posture to a second new posture in which the display screen and touch panel are arranged so as to face the user and have remained in the second new posture for a predetermined period of time.

10. The electronic unit system according to claim 9, in which the gesture input section determines the respective gesture input made by the user without using the touch panel.

11. The electronic unit system according to claim 9, in which the predetermined period of time is one second or more.

* * * * *